United States Patent Office 3,629,216
Patented Dec. 21, 1971

3,629,216
PROCESS FOR THE POLYMERIZATION OF OLEFINS
Koichiro Iwasaki and Kazuo Yamaguchi, Tokyo, Junichi Matsuura, Kanagawa-ken, Masayoshi Hasuo, Tokyo, and Kazuhisa Kojima, Kanagawa-ken, Japan, assignors to Mitsubishi Chemical Industries Limited
No Drawing. Filed May 7, 1969, Ser. No. 822,741
Claims priority, application Japan, May 14, 1968, 43/32,072
Int. Cl. C08f 1/66, 15/40, 3/06
U.S. Cl. 260—88.2      10 Claims

ABSTRACT OF THE DISCLOSURE

The catalyst of the invention comprises a first and a second catalyst component. The first catalyst component is prepared by immersing at least one of a heat-resistant metal oxide selected from the group consisting of silica and silica-alumina into an aqueous solution of chromium trioxide, drying the immersed metal oxide and then calcining it in a gaseous oxygen atmosphere at a temperature ranging from 500° to 1000° C. The second catalyst component comprises a pentaalkylsiloxyalane having the formula:

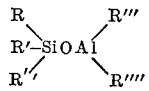

wherein R, R', R", R''' and R'''' are each an alkyl group having 1–10 carbon atoms, and the atomic ratio of silicon in the pentaalkylsiloxyalane to chromium in the chromium oxide is in the range of 0.01–500 in terms of Si/Cr.

---

This invention relates to a process for the polymerization of olefins. More particularly, this invention relates to a process for the polymerization of olefins by using a novel catalyst.

Known heretofore as polymerization catalysts for olefins, especially for ethylene, are transition metal compounds carried on supports such as silica, alumina, silica-alumina, zirconia, thoria, etc. It is also known that in the case of using these catalysts for the polymerization reaction, the molecular weight of the resulting polymer depends largely on the polymerization temperature and polymers suitable for marketing which have an average molecular weight of 50,000 to 100,000 are generally obtained at a polymerization temperature of 100°–200° C.

In case the polymerization was carried out at a low temperature, for example, at a temperature below 100° C. in the presence of these catalysts, however, the polymerization rate was lowered and controlling of the molecular weight of the resulting polymer became impossible so that industrially useful polyethylene could not be obtained. Morover, the polymerization using these catalysts has such a demerit that the concentration of polyethylene in the polymerization system has to be controlled. When the polymerization reaction is carried out at a temperature mentioned above, the resulting polyethylene will be dissolved in a solvent. As the polymerization proceeds, the concentration of polyethylene is increased with the result of increase of the viscosity of the polymerization system. The increased viscosity affects diffusion of ethylene monomer, thus slowing down the polymerization velocity. Therefore, the polymerization reaction is usually carried out to have a polyethylene concentration less than 20% in a solvent.

On the other hand, a number of catalysts such as those prepared by combining said catalyst with an organometallic compound have been proposed with a view to improving said catalysts to provide them with sufficient catalytic activity even at a low temperature. With the improved catalysts, however, sufficient polymerization velocity still could not be achieved at a low temperature and the molecular weights could not be controlled.

After making researches for preparing a catalyst capable of affording an industrially sufficient polymerization velocity not only at a high temperature but at a low temperature and of controlling freely the molecular weights, the present inventors have found that a catalyst possessing an extremely high catalytic activity even at a low temperature can be prepared by combining a certain transition metal oxide carried on a support with a specific compound and accomplished this invention on the basis of the above finding.

It is an object of this invention to provide an industrially advantageous process for the polymerization of olefins by using a catalyst possessing an extremely high catalytic activity not only at a high temperature but at a low temperature. It is another object of this invention to provide an industrially advantageous process for the polymerization of olefins in which the molecular weight of the resulting polymer can freely be controlled even at a low temperature. These objects can easily be attained by polymerizing olefins in the presence of a catalyst composed of (a) a catalyst component consisting of chromium oxide and a refractory metal oxide and (b) a pentaalkylsiloxyalane of the general formula $R_3SiOAlR_2$ wherein R represents independently an alkyl group having 1–10 carbon atoms.

Below are more detailed explanations of this invention. Whatever alkyl groups having 1–10 carbon atoms may be present in a compound of the general formula $$R_3SiOAlR_2$$

wherein R represents independently an alkyl group having 1–10 carbon atoms. Thus, R's may of course be identical alkyl groups or different alkyl groups. Particularly mentioned are compounds in which R's are same alkyl groups, such as pentamethylsiloxyalane, pentaethylsiloxyalane, pentabutylsiloxyalane, pentahexylsiloxyalane and pentaoctylsiloxyalane; or compounds in which R's are different alkyl groups, such as Si-trimethyl-Al-diethylsiloxyalane, Si-triethyl-Al-dimethylsiloxyalane, Si-triethyl-Al-dibutylsiloxyalane and Si-tributyl-Al-diethylsiloxyalane. Among these compounds, those having lower alkyl groups such as pentamethylsiloxyalane and Si-trimethyl-Al-diethylsiloxyalane are preferable.

It is known that such pentaalkylsiloxyalanes can be prepared usually by methods as shown by the following reaction formulas:

$$R_3SiOAlX_2 + 2MR \rightarrow R_3SiOAlR_2 + 2MX \quad (1)$$

$$R_3SiOM + XAlR_2 \rightarrow R_3SiOAlR_2 + MX \quad (2)$$

wherein R stands for an alkyl group having 1–10 carbon atoms, M for an alkali metal and X for a halogen atom (Journal of Organo-metallic Chemistry, vol. 1 (1963), p 28). It is also possible to synthesize such compounds according to the following reaction formula:

$$R_3SiOH + AlR_3 \rightarrow R_3SiOAlR_2 + RH \quad (3)$$

wherein R stands for an alkyl group having 1–10 carbon atoms.

These compounds in which R stands for a lower alkyl group such as methyl or ethyl are, unlike ordinary lower alkylaluminum compounds such as triethylaluminum, solid at ordinary temperature and have little tendency to spontaneous combustion when allowed to stand in the air. Thus, these compounds are convenient for handling and moreover very soluble in ordinary hydrocarbon solvents.

On the other hand, as the catalyst component consisting of chromium oxide and a heat-resistant metal oxide, which forms the catalyst together with such pentaalkylsiloxyalane, chromium oxide carried on a refractory metal oxide can be used. Such refractory metal oxides include silica, alumina, zirconia, thoria, etc. As is obvious among those skilled in the art, a mixture of these materials, for example, silica-alumina can of course be employed. Although these materials may be those commercially available, silica and silica-alumina are preferable. In general, finely divided materials having an average particle size of less than 10 microns are particularly preferable for their high polymerization activity. For this reason, finely divided silica represented by Syloids (Fuji-Davison), Aerosil (Degussa) and the like are especially recommendable.

Chromium oxide can easily be carried on such support by carrying an appropriate chromium compound on the metal oxide in any desired manner, for example, impregnation, distillation, sublimation or the like and then baking the compound. Appropriate chromium compounds include oxides, halides, oxyhalides, phosphate, sulfate, oxalate, alcoholates and organo-compounds of chromium, among which chromium trioxide, chromium sulfate and t-butyl chromate are particularly suitable. Activation of the catalyst component is effected by calcination after these chromium compounds are carried on said heat-resistant metal oxide. The content of chromium is preferably 0.1–5% by weight of the support.

The activation by calcination is generally carried out in the presence of oxygen but may be carried out in the presence of an inert gas or under reduced pressure. Usually, the calcination is carried out at a temperature of 300°–1200° C., preferably 400°–1100° C. and especially preferably 500°–1000° C. for a period from several minutes to several ten hours, preferably from 10 minutes to 10 hours.

The catalyst is prepared from these catalyst components. The proportion of the catalyst components is usually within the range of 0.01–500 in terms of Si/Cr (atomic ratio). However, the range of 0.1–50 is particularly preferable from the industrial point of view.

A method of preparing the catalyst is not critical and is carried out by reacting both catalyst components prior to the polymerization reaction or by introducing into the reaction system both components in the form of a mixture. These components may of course be introduced into the reaction system separately. Further, other components may be present in the reaction system.

The polymerization of olefins is carried out by using the catalyst thus obtained. Olefins utilizable in this invention include ethylene, propylene, butene-1 and the like. It is also possible to copolymerize a mixture of these olefins. The polymerization reaction is carried out usually by dispersing the catalyst into an inert solvent, supplying an olefin thereto and maintaining the mixture at given temperature and pressure.

As the inert solvents, aliphatic hydrocarbons such as hexane, heptane, octane and iso-octane; cycloaliphatic hydrocarbons such as cyclopentane and cyclohexane; and aromatic hydrocarbons such as benzene and toluene are preferably employed but any other solvents usually used for the polymerization reaction can also be employed. The polymerization reaction is carried out at relatively low temperature and pressure. Temperatures ranging from room temperature to 250° C. and pressure usually within the range from atmospheric pressure to 100 atm. are sufficient enough to attain the purpose of polymerization. In the process of this invention, the polymerization may be carried out in vapor phase and moreover, hydrogen may be present in the reaction system to control the average molecular weight and other physical properties of the resulting polymers. As the quantity of hydrogen to be present depends on the polymerization conditions and the molecular weight of the polymer aimed at, it is necessary to adjust the quantity adequately.

The polymerization of olefins is performed in a manner as mentioned above. As the catalyst utilizable for the process of this invention is promptly deactivated by moisture, oxygen, etc., however, the starting materials to be supplied to the polymerization system such as olefin, hydrogen and solvent are desirably those which have previously been refined sufficiently.

Polymers manufactured by the process of this invention are colorless, crystalline polymers of high density and are suitable for the use of molding, especially blow molding.

As is evident from the foregoing detailed explanations, the catalyst prepared according to the process of this invention possesses an excellently high catalytic activity. When the polymerization of olefin is carried out by using the catalyst prepared according to the process of this invention, an extremely high degree of polymerization activity is exhibited not only at a high temperature but also at a low temperature and the average molecular weight of the resulting polymers can easily be controlled. Since the process of this invention enables, as stated above, to perform the polymerization reaction sufficiently even at a low temperature, the resulting polymers exist in the polymerization reaction system as slurry, thus inhibiting increase of the viscosity of the polymerization system. Therefore, the concentration of polymers in the polymerization system can be increased, for example, to 30% or more with a number of technical merits such as dwarfing of the polymerization reactor, decrease of the amount of a circulating solvent and incidental diminishing of utility.

The following examples illustrate this invention but they are not intended to limit this invention so far as it does not overstep the scope defined in the claims.

EXAMPLE 1

10 grams of finely divided silica (syloids 244, average particle size: 300° A.; Fuji-Davison) were dipped into 40 ml. of an aqueous solution of 0.20 g. of chromium trioxide. The resulting slurry was dried at 120° C. and then calcined at 800° C. for 1 hour in a stream of dry air for activation. The resulting catalyst component (referred to hereinafter as "chromium oxide catalyst component") contained 1% of chromium.

On the other hand, the other catalyst component was prepared in accordance with the reaction Formula 3 as follows: After replacing the air in a 200 ml. flask provided with a stirrer by argon gas, 100 ml. of cyclohexane and about 11.4 g. (0.1 mol) of triethylaluminum were placed in the flask and then the flask was maintained at 50° C. At the upper part of the flask, a reflux condenser was provided, to which a gas meter was connected. One of the openings of flask was stoppered with a gasket seal through which about 9.0 g. (0.1 mol) of trimethylsilanol $Si(CH_3)_3OH$ were carefully added gradually by the aid of an injector for a period of about 1 hour. A violent reaction was initiated by the addition of trimethylsilanol and ethane gas was evolved. The amount of gas generated was about 2.3 liters at ordinary temperature and pressure.

After complete removal of trimethylsilanol, the reflux condenser was replaced with a distillating apparatus and the majority of cyclohexane was distilled under ordinary pressure. A subsequent distillation under reduced pressure permitted distilling of a trace of low boiling components followed by Si-trimethyl-Al-diethylsiloxyalane as the main product at 107°–108° C./6 mm. Hg. The yield was 14.5 grams (83%). The resulting Si-trimethyl-Al-diethylsiloxyalane was a viscous oily substance just after the distillation but gradually crystallized when allowed to stand at room temperature. The boiling point of this product was 107°–108° C./6 mm. Hg or 135°–140° C./18 mm. Hg.

Into a 1 liter autoclave provided with an electromagnetic stirrer were charged 52 mg. of the chromium oxide catalyst component and 8.7 mg. (0.05 mmol) of Si-trimethyl-Al-diethylsiloxyalane thus obtained together with 500 ml. of sufficiently dehydrated and deoxygenated n-heptane. After purging the air in the autoclave with dry nitrogen, the mixture was heated to 80° C. Into the autoclave was introduced ethylene until the total pressure reached 5 kg./cm.² At the time ethylene was introduced, heat was evolved and polymerization of ethylene was observed. The polymerization was carried out for 1 hour under constant pressure while the polymerization temperature and the total pressure were maintained at 80° C. and 5 kg./cm.², respectively, to obtain 123.7 g. of white powdery polyethylene having an average molecular weight of 222,000. In this polymerization reaction, the polymerization velocity to the chromium oxide catalyst component was 2370 g./g. chromium oxide catalyst component·hr.

EXAMPLE 2

Except that the pressure of ethylene at the time of polymerization and the polymerization time were modified, the reaction was carried out similarly as in Example 1 and the results as shown in the Table 1 below were obtained.

TABLE 1

| No. | Pressure of ethylene (kg./cm.²) | Polymerization time (min.) | Velocity of polymerization (g. EP/g. cat¹·hr.) |
| --- | --- | --- | --- |
| 1 | 5 | 60 | 2,370 |
|   | 10 | 30 | 4,530 |
| 2 | 20 | 20 | 8,920 |
| 3 | 30 | 10 | 13,300 |

¹ Cat—the chromium oxide catalyst component.

EXAMPLE 3

Except that the polymerization temperature in Example 1 was varied, the polymerization of ethylene was carried out quite analogously as in the case of Example 1 and the results as shown in the Table 2 were obtained.

TABLE 2

Polymerization temperature (° C.): Velocity of polymerization (g. EP/g. cat¹·hr.)

60 ——————————————————————————— 2,210
  80 ——————————————————————————— 2,370
 100 ——————————————————————————— 2,520
 120 ——————————————————————————— 1,010
 150 ——————————————————————————— 420

¹ Cat—the chromium oxide catalyst component (this designation will apply to the tables given hereinafter).

EXAMPLE 4

Except that the quantity of Si-trimethyl-Al-diethylsiloxyalane was modified variously as shown in the Table 3, the polymerization of ethylene was carried out quite analogously as in Example 1 and the results as shown in the Table 3 were obtained.

TABLE 3

| Quantity of $(CH_3)_3SiOAl(C_2H_5)_2$ (mmol) | Si/Cr (atomic ratio) | Velocity of polymerization (g. EP/g. cat¹·hr.) |
| --- | --- | --- |
| 0.0005 | 0.05 | 270 |
| 0.001 | 0.1 | 850 |
| 0.005 | 0.5 | 1,920 |
| 0.01 | 1 | 2,290 |
| 0.05 | 5 | 2,370 |
| 0.1 | 10 | 2,410 |
| 0.5 | 50 | 2,390 |
| 1 | 100 | 1,380 |

¹ Cat—the chromium oxide catalyst component.

EXAMPLE 5

The catalyst prepared similarly as in Example 1 and n-heptane were charged in amounts equal to those used in Example 1 and a 1 liter autoclave. The temperature of the autoclave was raised to 80° C. and a given amount of hydrogen was introduced into the autoclave under agitation while this temperature was maintained. Ethylene was then introduced so that further pressure of 5 kg./cm.² was added. The polymerization reaction was carried out at 80° C. for 1 hour under constant pressure while ethylene was supplied to maintain the total pressure constantly. The results obtained were shown in Table 4.

TABLE 4

| Quantity of hydrogen (kg./cm.²) | Total pressure (kg./cm.²) | Velocity of polymerization (g. EP/g. cat¹·hr.) | Average molecular weight |
| --- | --- | --- | --- |
| 0 | 5.0 | 2,370 | 222,000 |
| 2.5 | 7.5 | 2,530 | 112,000 |
| 5.0 | 10.0 | 2,470 | 77,000 |
| 7.5 | 12.5 | 2,610 | 56,000 |

¹ Cat—the chromium oxide catalyst component.

EXAMPLE 6

Each 10 g. of various kinds of finely divided silica as shown in Table 5 were dipped into 40 ml. of an aqueous solution of a given amount of chromium trioxide. The resulting slurry was dried at 120° C. and activated at a given temperature for a given period of time in a stream of dry air. The chromium content of the resulting chromium oxide catalyst component was as shown in Table 5. The resulting chromium oxide catalyst component was combined with Si-trimethyl-Al-diethylsiloxyalane prepared in a manner similar to that of Example 1, to prepare the catalyst. The polymerization of ethylene was carried out by using the resulting catalyst under the conditions quite same as those of Example 1 and the results as shown in Table 5 were obtained.

TABLE 5

| Heat-resistant metal oxide | Content of Cr (percent) | Activation conditions Temperature (° C.) | Time (hr.) | Si/Cr (atomic ratio) | Velocity of polymerization (g. EP/g. cat¹·hr.) |
| --- | --- | --- | --- | --- | --- |
| Syloid 244² | 2.0 | 600 | 2 | 2.5 | 1,550 |
| Do. | 1.0 | 600 | 2 | 5 | 1,720 |
| Do. | 1.0 | 800 | 2 | 5 | 2,210 |
| Do. | 1.0 | 800 | 1 | 5 | 2,370 |
| Do. | 0.5 | 950 | 0.5 | 10 | 2,730 |
| Do. | 0.5 | 1,000 | 0.5 | 10 | 2,050 |
| Aerosil O³ | 1.0 | 800 | 1 | 5 | 1,750 |
| Do. | 0.5 | 950 | 0.5 | 10 | 2,000 |

¹ Cat—the chromium oxide catalyst component.
² Finely divided silica marketed by Fuji-Davison.
³ Finely divided silica marketed by Degussa.

EXAMPLE 7

Except that in the preparation of Si-trimethyl-Al-diethylsiloxyalane in Example 1, trimethylaluminum was substituted for triethylaluminum, pentamethylsiloxyalane was prepared quite analogously as in Example 1. The boiling point of the resulting pentamethylsiloxyalane was 80°–82° C./cc mm. Hg.

Except that pentamethylsiloxyalane thus obtained was substituted for Si-trimethyl-Al-diethylsiloxyalane, the polymerization of ethylene was carried out quite analogously as in Example 1. As the result, 133.5 g. of white powdery polyethylene having an average molecular weight of 238,000 were obtained. Analogous results were obtained when Si-trimethyl-Al-diisobutylsiloxyalane and Si-trimethyl-Al-dioctylsiloxyalane were used.

EXAMPLE 8

The catalyst prepared similarly as in Example 1 and the solvent were charged in amounts equal to those used in Example 1 into a 1 liter autoclave. The temperature of the autoclave was raised to 80° C. and hydrogen was introduced under agitation to 2.5 kg./cm.$^2$. An ethylene propylene mixture containing a small amount of propylene was then introduced under agitation so that further pressure of 5 kg./cm.$^2$ was added. The polymerization reaction was carried out at 80° C. for 1 hour under constant pressure while the ethylene-propylene mixture was supplied to maintain the whole pressure at 7.5 kg./cm.$^2$. As the result, 118.0 g. of white powdery copolymer were obtained. An IR-absorption spectrum analysis of the resulting copolymer which was pressed to a thin plate showed that the copolymer was an ethylene-propylene copolymer having 2.8 branched methyl groups per 1,000 carbon atoms.

The result of analysis on the vapor phase gases in the autoclave before and after the polymerization showed on average the following composition:

| | Wt. percent |
|---|---|
| Ethylene | 65 |
| Propylene | 2 |
| Hydrogen | 33 |

EXAMPLE 9

The catalyst prepared similarly as in Example 1 and the solvent were charged in amounts equal to those used in Example 1 into a 1 liter autoclave. The temperature of autoclave was raised to 80° C. and hydrogen was introduced under agitation to 3.0 kg./cm.$^2$. Ethylene was then introduced so that further pressure of 5 kg./cm.$^2$ was added. The polymerization reaction was carried out at 80° C. for 1 hour under constant pressure while ethylene was supplied to maintain the total pressure at 8 kg./cm.$^2$. As the result, 130.0 g. of white powdery polyethylene were obtained. After drying the resulting polyethylene sufficiently, various physical properties of the polymer were measured and the results as shown in Table 6 were obtained.

TABLE 6

| Physical properties: | Measured results |
|---|---|
| Melt index [1] | 0.29 |
| Flow ratio [2] | 151 |
| Density [3] | 0.965 |
| First yield strength [4] | 262 |

[1] Measured according to ASTM-D-1238.
[2] Ratio by weight of polyethylene flowing out per unit time respectively at 10$^5$ dyne/cm.$^2$ and 10$^6$ dyne/cm.$^2$ of shear rate at the same temperature of 190° C. (the greater the ratio, the broader the distribution of molecular weights of polymers).
[3] Measured according to ASTM-D-1248 (g./cm.$^3$).
[4] Measured according to ASTM-D-638 (kg./cm.$^2$).

COMPARATIVE EXAMPLE 1

Into a 1 liter autoclave provided with an electromagnetic stirrer were charged 500 ml. of sufficiently dehydrated and deoxygenated n-heptane and 250 mg. of the chromium oxide catalyst component alone. After purging the air in the autoclave with dry nitrogen, the mixture was heated to 80° C. Ethylene was then introduced under agitation and the polymerization reaction was carried out for 1 hour under constant total pressure of 10 kg./cm.$^2$ to obtain 88.8 g. of white powdery polyethylene having an average molecular weight of 235,000. In this polymerization reaction, the polymerization velocity to the catalyst component was 355 g. EP/g. cat·hr.

This result obviously shows that the catalyst according to this invention is excellent in the polymerization velocity as compared with catalysts heretofore known.

COMPARATIVE EXAMPLE 2

The catalyst component and solvent same as those used in Comparative Example 1 were charged in amounts equal to those used therein into a 1 liter autoclave. The temperature of the autoclave was raised to 80° C. and hydrogen in a given amount was introduced. Ethylene was then introduced so that further pressure of 10 kg./cm.$^2$ was added. The polymerization reaction was carried out at 80° C. or 1 hour under constant pressure while ethylene was supplied to maintain the total pressure constantly. The results obtained are shown in Table 7.

TABLE 7

| Quantity of $H_2$ (kg./cm.$^2$) | Total pressure (kg./cm.$^2$) | Velocity of polymerization (g. EP/g. cat·hr.) | Average molecular weight |
|---|---|---|---|
| 0 | 10 | 355 | 235,000 |
| 10 | 20 | 320 | 171,000 |
| 20 | 30 | 341 | 124,000 |
| 30 | 40 | 298 | 100,000 |

This result evidently shows that catalysts heretofore known provide a slow polymerization velocity in the polymerization at a relatively low temperature and controlling of the molecular weight by hydrogen is very inferior to the case of this invention (Example 5 referred to).

COMPARATIVE EXAMPLE 3

The catalyst component and solvent same as those used in Comparative Example 1 were charged into a 1 liter autoclave. The temperature of the autoclave was raised to 80° C. and hydrogen was introduced under agitation to 30 kg./cm.$^2$. Ethylene was then introduced so that further pressure of 10 kg./cm.$^2$ was added. The polymerization reaction was carried out at 80° C. for 1 hour under constant pressure while ethylene was supplied to maintain the whole pressure at 40 kg./cm.$^2$. As the result, 74.5 g. of white powdery polyethylene were obtained. After drying this polyethylene enough, various physical properties of the polymer were measured according to given methods and the results as shown in Table 8 were obtained.

TABLE 8

| Physical properties: | Measured results |
|---|---|
| Melt index | 0.25 |
| Flow ratio | 45 |
| Density | 0.964 |
| First yield strength | 238 |

This result apparently shows that polyolefins obtained according to this invention (Example 9 referred to) have broader distribution of molecular weights than those obtained by known methods.

What is claimed is:

1. A catalyst comprising chromium oxide carried on a heat-resistant metal oxide and a pentaalkylsiloxyalane of the general formula

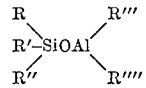

wherein R, R', R'', R''' and R'''' are each independently selected from the group consisting of alkyl groups having 1 to 10 carbon atoms and the atomic ratio of silicon in the pentaalkylsiloxyalane to chromium in the chromium oxide is 0.01–500 in terms of Si/Cr.

2. The catalyst according to claim 1 wherein the chromium oxide is prepared by calcining a chromium compound carried on said heat-resistant metal oxide, at a temperature in the range of 300–1200° C.

3. A catalyst comprising a first catalyst component prepared by immersing at least one of a heat-resistant metal oxide selected from the group consisting of silica and silica-alumina into an aqueous solution of chromium trioxide, drying the immersed metal oxide and then calcining it in a gaseous oxygen atmosphere at a temperature ranging from 500° to 1000° C. to form chromium oxide, and a second catalyst component comprising a pentaalkylsiloxyalane having the formula

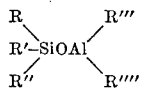

wherein R, R', R", R''' and R'''' are each independently selected from the group consisting of alkyl groups having 1 to 10 carbon atoms, and the atomic ratio of silicon in the pentaalkylsiloxyalane to chromium in the chromium oxide is 0.01–500 in terms of Si/Cr.

4. The catalyst according to claim 1 wherein the heat-resistant metal oxide is silica.

5. The catalyst according to claim 3 wherein the heat-resistant metal oxide is silica.

6. The catalyst according to claim 1 wherein the heat-resistant metal is finely divided silica having an average particle size of less than 10 microns.

7. The catalyst according to claim 3 wherein the heat-resistant metal is finely divided silica having an average particle size of less than 10 microns.

8. An olefin polymerization process which process comprises polymerizing an olefin at a temperature of from room temperature to 250° C. and under pressure of from atmospheric pressure to 100 atm. with a catalyst comprising chromium oxide carried on a heat-resistant metal oxide and a pentaalkylsiloxyalane of the general formula

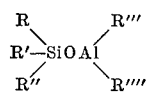

wherein R, R', R", R''' and R'''' are each independently selected from the group consisting of alkyl groups having 1 to 10 carbon atoms, and the atomic ratio of silicon in the pentaalkylsiloxyalane to chromium in the chromium oxide is 0.01–500 in terms of Si/Cr.

9. The process as claimed in claim 8 wherein said olefin is at least one olefin selected from the group consisting of ethylene, propylene and butene-1, and the polymerization is carried out in an inert solvent in the presence of gaseous hydrogen.

10. The process as claimed in claim 8, wherein said olefin is selected from the group consisting of ethylene and a mixture of ethylene and propylene, the temperature is from 60 to 150° C., and the polymerization is carried out in an inert solvent and in the presence of hydrogen at a pressure no more than that of the olefin.

References Cited

UNITED STATES PATENTS 3,513,151   5/1970   Santiago ........... 252—431 R

JOSEPH L. SCHOFER, Primary Examiner

A. HOLLER, Assistant Examiner

U.S. Cl. X.R.

252—430, 458; 260—94.9 D